United States Patent
K

(10) Patent No.: US 10,999,242 B1
(45) Date of Patent: May 4, 2021

(54) CARRIER GRADE NAT SUBSCRIBER MANAGEMENT

(71) Applicant: Juniper Networks, Inc., Sunnyvale, CA (US)

(72) Inventor: Amal K, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/996,605

(22) Filed: Aug. 18, 2020

(51) Int. Cl.
*G06F 15/16* (2006.01)
*H04L 29/12* (2006.01)

(52) U.S. Cl.
CPC ...... *H04L 61/2046* (2013.01); *H04L 61/2053* (2013.01); *H04L 61/2076* (2013.01)

(58) Field of Classification Search
None
See application file for complete search history.

(56) References Cited

U.S. PATENT DOCUMENTS

| | | | | |
|---|---|---|---|---|
| 7,079,499 | B1 * | 7/2006 | Akhtar | H04L 63/08 370/310 |
| 2007/0086382 | A1 * | 4/2007 | Narayanan | H04W 12/03 370/331 |
| 2008/0044181 | A1 | 2/2008 | Sindhu | |
| 2010/0169478 | A1 * | 7/2010 | Saha | H04L 65/80 709/224 |
| 2013/0132539 | A1 * | 5/2013 | Meyer | H04L 9/00 709/222 |

* cited by examiner

*Primary Examiner* — Phyllis A Book
(74) *Attorney, Agent, or Firm* — Shumaker & Sieffert, P.A.

(57) ABSTRACT

This disclosure describes techniques that enable a service provider to synchronize public-private Internet protocol (IP) pairs between a central logging entity (CLE) server that attributes network traffic and network address translation NAT device that logs network traffic. The CLE server includes a communication protocol client communicatively coupled to a communication protocol host. The CLE server, in response to receiving a deregistration message from a registration protocol server, sends a clear request message comprising a private address via the communication protocol client. The deregistration message includes the private address. The NAT device includes the communication protocol host. The NAT device, in response to receiving the clear request message comprising the private address via the communication protocol host, clears a binding that maps the private address to a public address to prevent network address translation between the private address and the public address.

15 Claims, 5 Drawing Sheets

CARRIER GRADE NAT SUBSCRIBER MANAGEMENT

TECHNICAL FIELD

The disclosure relates to computer networks and, more particularly, to network address translation in computer networks

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server in each subnet may be responsible for allocating these network addresses in accordance with a network address allocation protocol, such as a dynamic host configuration protocol (DHCP).

Service provider networks typically assign private network addresses to subscriber equipment (e.g., cable modems, DSL modems, or mobile devices, also referred to herein as "subscriber devices") utilized by their customers. For example, a DHCP server or RADIUS server may dynamically assign a private address to a subscriber equipment upon establishing a network connection for the subscriber equipment. When not in use, the network connection is torn down and the private address is returned to a pool of provider addresses utilized within the service provider network. These private addresses are not routable outside the service provider network. Instead, a network address translation (NAT) device translates the private addresses currently used by each subscriber equipment to public network addresses that are routable within a public network, such as the Internet.

Service providers typically maintain information such that any given network address that sourced or received certain traffic can be traced back to the subscriber equipment of the particular customer. This may be done for law enforcement, billing, or account maintenance purposes. As a result, service providers typically deploy a Carrier Grade NAT (CGN) archive system that maintains archives of NAT system log ("syslog") files. Each syslog file stored by the CGN archive system potentially consumes a significant amount of information, including each subscriber login and, for each login, the private source IP address, the private source port, any VPN information of the subscriber, tunneling information, any NAT rules/terms, public IP address, and port assigned to the subscriber equipment. As such, in a typical service provider network, the CGN archive system is tasked with burden of correlating subscriber login and address allocation information from databases of, for example, an authentication, authorization, and accounting (AAA) server or access gateway with network address translation information from routers or NAT devices forwarding network traffic within the subscriber network. This correlation can present significant challenges and burdens in certain environments, such as large service provider networks where session setup rate is typically very high with tens of millions of sessions being established and torn down each day across the network.

SUMMARY

In general, this disclosure describes techniques that enable a service provider to synchronize public-private Internet protocol (IP) pairs between a central logging entity (CLE) server that logs network traffic and a network gateway with a Carrier Grade NAT (CGN). The public-private IP pairs include (i) a private IP address assigned to a subscriber device (sometimes referred to as "customer premise equipment" or "CPE") in a private network and (ii) a public IP address associated with the private network in a public network. When the subscriber device connects to the private network and is assigned a private address, the CGN provides network address translation to route traffic received on the public IP address to the private IP address of the subscriber device. The CGN also sends a NAT event log to the CLE server to associate network traffic with the public-private IP pair. The CLE server may then associate the NAT event log with the subscriber device based on the public-private IP pair. When the subscriber device disconnects, the CLE server instructs the CGN to clear the NAT binging associating public-private IP pair to prevent misattribution of network traffic after the subscriber device has disconnected.

An example system includes a CLE server and a NAT service. The CLE server includes a communication protocol client communicatively coupled to a communication protocol host. The CLE server, in response to receiving a deregistration message from a registration protocol server, sends a clear request message comprising a private address via the communication protocol client. The deregistration message includes the private address. The NAT device includes the communication protocol host. The NAT device, in response to receiving the clear request message comprising the private address via the communication protocol host, clears a binding that maps the private address to a public address to prevent network address translation between the private address and the public address.

An example method includes, in response to receiving a deregistration message from a registration protocol server, sending, by a central logging entity (CLE) server including a communication protocol client communicatively coupled to a communication protocol host, a clear request message comprising a private address via the communication protocol client. The deregistration message includes the private address. In response to receiving the clear request message comprising the private address via the communication protocol host, clearing, by a network address translation (NAT) device including the communication protocol host, a binding that maps the private address to a public address A computer readable medium comprising instructions that, when executed, cause a central logging entity (CLE) server to operate a communication protocol client communicatively coupled to a communication protocol host of a network address translation (NAT) device. The instructions also cause the CLE server to attribute network traffic to a subscriber device associated with a private address based on NAT event logs generated by the NAT device resulting from network address translation between the private address and a public address. Additionally, the instructions cause the CLE server to, in response to receive a deregistration message from a registration protocol server indicative of the subscriber device no longer being associated with the private address, send a clear request message comprising the private address included in the deregistration message to the NAT device via the communication protocol client. The clear request message causes the NAT device to clear a binding that maps the private address to a public address and prevent network address translation between the private address and the public address.

The details of one or more examples are set forth in the accompanying drawings and the description below. Other

DETAILED DESCRIPTION

Figure 1:
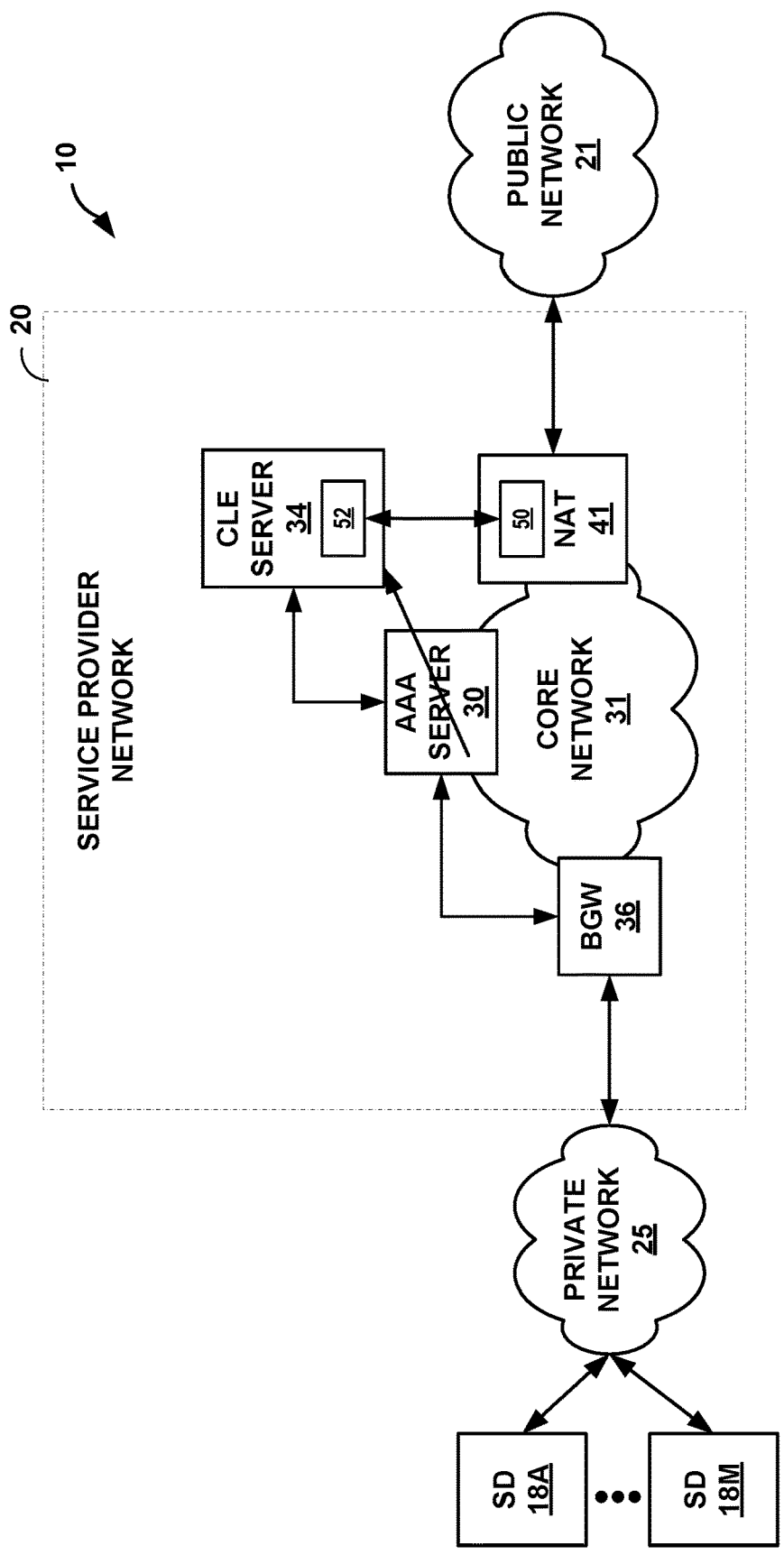
FIG. 1 is a block diagram illustrating an example network system that synchronizes the network address translation (NAT), according to the techniques described in this disclosure.

Service providers often need to track mappings between private Internet protocol (IP) addresses and public IP addresses (sometimes referred to as "public-private IP pairs") of subscriber equipment, due to legal, billing, and/or account management requirements. Network Address Port Translation (NAPT) leads to many private addresses being mapped to one public address. Service providers collect, for example, the Remote Authentication Dial-In User Service (RADIUS)/Dynamic Host Configuration Protocol (DHCP) logs for the private address allocated to the subscriber device to identify the subscriber based on the private IP address. While the examples herein describe use the RADIUS protocol, other account management protocols may be used, such as DIAMETER or GTP-C, etc. Service providers operate a carrier gateway with a network address translation (NAT) element to route traffic between a one network (e.g., a public network) to a private network. Service providers collect NAT event logs that map traffic from the public IP address to the private IP address that are generated by the NAT device. A central logging entity (CLE) server pulls these logs and then run scripts to ingest NAT logs with RADIUS/DHCP logs and associated traffic with the subscriber.

When a subscriber device connects to the private gateway (sometimes referred to as a "broadband network gateway" or "BNG"), the private gateway sends, for example, a RADIUS Account START message to an authentication, authorization and accounting (AAA) server. The RADIUS Account START includes the private IP address assigned to the subscriber device, a timestamp, and an identifier associated with the subscriber and/or subscriber device. The AAA server forwards the RADIUS Account START to the CLE server. In response to a subscriber device-initiated traffic on the network, the NAT device sets up NAT-binding/mapping for the subscriber device. As traffic flows between the public and private network, the NAT device generates NAT event logs that include the timestamp, the public IP address, the private IP address, and/or the port range, etc. The CLE server pulls these NAT event logs. The CLE server may then start attributing network traffic to a subscriber and/or subscriber device.

Eventually, the subscriber device disconnects from the private gateway. The private gateway sends, for example, a RADIUS Account STOP message to the AAA server, which forwards the STOP message to the CLE server. Because the NAT device and the private gateway are two separate devices, the NAT mappings do not sync with the disconnection. Thus, in one example, traffic directed to the private IP address may still be logged by the NAT device that is ultimately dropped by the private gateway because the subscriber device has disconnected while the traffic is still being directed to the private IP address. In another example, a different subscriber device may be assigned the private IP address of the original subscriber device and start receiving traffic. Additionally, because the private gateway and the NAT device are two different network entities, there may be timestamp synchronization issues such that the two sets of timestamps may not entirely correlate. As a result, some traffic is misattributed. This misattribution prevents accuracy for legal, billing, and/or account management requirements. The misattribution also reduces subscriber granularity for analytics.

As described below, the NAT device includes or is in communication with a port control protocol (PCP) server and the CLE server includes a PCP client. When a private gateway is configured to use RADIUS Accounting, at the start of service delivery (e.g., the subscriber device connects), the private gateway generates an RADIUS Start message describing the type of service being delivered and the subscriber it is being delivered to. The private gateway sends the RADIUS Start message to the AAA server. This RADIUS Start message may also proxied to multiple servers, including CLE server. In response to the subscriber device-initiated traffic, the NAT device sets up NAT-binding/ mapping for the subscriber device. The NAT device logs NAT events which are retrieves and/or otherwise received by the CLE server. Based on the information in the RADIUS Account START message and the NAT events, the CLE server may attribute network traffic to the subscriber device. Upon the subscriber device disconnecting from the private network, the private gateway sends a RADIUS Account Stop message to the AAA server, that is proxied to the CLE server. When the CLE server receives a RADIUS Account STOP message, the CLE server sends a clear request, via the PCP client, to the NAT device to clear the NAT mapping to a specified private IP address. Upon receipt of a clear request, the NAT device clears the NAT mapping associated with the specified private IP address. As a consequence, the carrier gateway will drop traffic that was designed for the now disconnected subscriber device and will not generate NAT event logs. This prevents traffic misattribution.

FIG. 1 is a block diagram illustrating an example network system 10 that implements the network address translation (NAT) synchronization described in this disclosure. As shown in the example of FIG. 1, network system 10 includes a service provider network 20 and a public network 21. In the example of FIG. 1, service provider network 20 operates as a private network that provides packet-based network access to subscriber devices 18A-18M that may be endpoint computing devices, such as personal computers, laptop computers or other types of computing device associated with subscribers, or many be devices (e.g., routers, etc.) that service endpoint computing devices. Subscriber devices 18 may comprise, for example, a mobile telephone, a laptop or desktop computer (e.g., having a 3G wireless card, etc.), a wireless-capable netbook, an Internet-of-Things (IoT) device, a video game device, a pager, a smart phone, or a personal data assistant (PDA), etc. Each of subscriber device may run one or more applications, such as mobile calls, video games, videoconferencing, and email, video streaming, web browsing, among others.

In the example of FIG. subscriber devices 18 connect to a broadband network gateway (BGW) 36 via private network 25. Private network 25 may comprise a network switch. In one example, subscriber devices 18 may be DSL modems and the network switch may comprise a digital subscriber line access multiplexer (DSLAM) or other switching device. Subscriber devices 18 may utilize a Point-to-Point Protocol (PPP), such as PPP over ATM or PPP over Ethernet (PPPoE), to communicate with the network switch. For example, using PPP, one of subscriber devices 18 may request access to core network 31 and provide login information, such as a username and password, for authentication by AAA server 30. PPP may be supported on lines such as digital subscriber lines (DSLs) that connect subscriber devices 18 with the network switch. In other embodiments, subscriber devices 18 may utilize a non-PPP protocol to communicate with the network switch. In other examples, subscriber devices 18 may use other lines besides DSL lines, such as cable, Ethernet over a T1, T3 or other access links.

The network switch may communicate with broadband network gateway 36 over a physical interface supporting various protocols, e.g., ATM interface supporting ATM protocols. Broadband network gateway 36 typically includes Broadband Remote Access Server (BRAS) functionality to aggregate output from switches into a higher-speed uplink to core network 31. In some embodiments, broadband network gateway 36 may comprise a router that maintains routing information between subscriber devices 18 and core network 31.

Service provider network 20 may also include radio access network in which one or more base stations of private network 25 communicate via radio signals with subscriber devices 18. The radio access network is a transport network that enables base stations to exchange packetized data with core network 31 of the service provider, ultimately for communication with public network 21. The radio access network typically comprises communication nodes interconnected by communication links, such as leased land-lines or point-to-point microwave connection. The communication nodes comprise network, aggregation, and switching elements that execute one or more protocols to route packets between base stations and a gateway device. Core network 31 provides session management, mobility management, and transport services between a backhaul network and core network 31 to support access, by subscriber devices 18, to public network 21 and services of protected resources. Core network 31 may comprise, for instance, a general packet radio service (GPRS) core packet-switched network, a GPRS core circuit-switched network, an IP-based mobile multimedia core network, or another type of transport network. Core network 31 typically includes one or more packet processing nodes to support firewall, load balancing, billing, deep-packet inspection (DPI), and other services for mobile traffic traversing the mobile core network.

AAA server 30 is typically an authentication, authorization and accounting (AAA) server to authenticate the credentials a subscriber requesting a network connection. The AAA server 30 may be integrated within a router or gateway of broadband network or on a separate network device and may be, for example, a Remote Authentication Dial-In User Service (RADIUS) server. Upon authenticating a network access request from a subscriber device 18, AAA server 30 assigns a private layer three (L3) network address (e.g., an IPv4 network address) for receiving data services within service provider network 20. This may be accomplished in a variety of ways. For example, the private network address may be statically configured on the subscriber device or may be dynamically or statically assigned by AAA server 30 (or gateway 28). Typically, upon authentication of the subscriber, AAA server 30 selects a private IP address from a pool of private network addresses. When a subscriber device connects to receive traffic from public network 21 via core network 31, BGW 36 sends a RADIUS account START message to AAA server 30 for authentication and assignment of a private IP address. AAA server 30 then proxies the RADIUS account START message to central logging entity ("CLE") server 34.

Network address translation (NAT) device 41 provides network address translation for private network addresses routable within service provider network to public network addresses routable within public network 21. As one example, NAT device 41 applies a source network address and port translation (NAPT) mechanism for subscriber data traffic forwarded within the core network 31. For example, when routing outbound packets of subscriber data traffic, NAT device 41 applies a binding that maps private source addresses of the outbound packets to public addresses and ports. NAT device 41 performs network address translation to translate the private source network address within the packet to the public network address and port number bound to the particular subscriber communication session. Upon receiving an inbound packet from public network 21, NAT device 41 identifies a current NAT entry for the communication session and maps the public destination network address and the destination port to the corresponding private network address and port. NAT device 17 may then replace all or a portion of a header (e.g., IP or UDP header) within the packet.

NAT device 41 generates and temporarily caches NAT logs in which NAT operations performed by NAT device 41 when processing transit data packets are correlated with the corresponding subscriber information. That is, when performing NAT operations, NAT device 41 generates the NAT logs that comprise the private IP address, the public IP address, and a timestamp. NAT device 41 provides access to CLE server 34 to retrieve the NAT logs. Generally, communication between CLE server 34 and NAT device 41 is asynchronous. NAT device 41 generates the NAT logs and, form time-to-time, CLE server 34 retrieves the generated NAT logs from NAT device 41. In the illustrated example, NAT device 41 includes an additional communication protocol host 50. In some examples, communication protocol host 50 is a Port Control Protocol (PCP) host that facilitates synchronous communication between NAT device 41 and CLE server 34. As described below, CLE server 34 provides requests to NAT device 41 via communication protocol host 50. In some examples, CLE server 34 may provide a clear request that comprises a private IP address. In response to receiving a clear request, NAT device 41 clears the clears the binding that maps the public/private IP address pair associated with the provided private IP address. In such a manner, after receiving a clear request, NAT device 41 does not provide translation for that public/private IP address mapping until it is reestablished (e.g., in response to another subscriber device being assigned the private IP address, etc.).

CLE server 34 assigns network traffic to a subscriber and/or subscriber device 18 responsible for that traffic. CLE server 34 receives RADIUS account START messages from AAA server 30 that comprise a private IP address, a subscriber identifier, and a timestamp. From time-to-time, CLE server 34 retrieves and/or otherwise receives the NAT logs from NAT device 41 (e.g., NAT 41 pushes the generated NAT event logs to CLE 34 or CLE 34 pulls the NAT event logs from NAT 41, etc.) that comprise each comprise a private IP address, a public IP address. The NAT logs are presentative of traffic packets for which NAT device 41 provided translation. Using the information in the RADIUS account START messages and the information in the NAT logs, CLE attributes traffic to a subscriber and/or subscriber device 18. In the illustrated example, CLE server includes a communication protocol client 52 that corresponds and is communicatively coupled to communication protocol host 50. In some examples, communication protocol client 52 is a PCP client. When a subscriber device disconnects for BGW 36, CLE server 34 receives a RADIUS account STOP message comprising a private IP address associated with the one of subscriber devices 18 that disconnected. In response, CLE server 34 sends a clear request to NAT device 41 with the private IP address to cause NAT device 41 to that binding that maps the corresponding private IP address to a public IP address. As a result, NAT device 41 does not produce more NAT logs for the private IP address until another subscriber device 18 is assigned that private IP address (e.g., as evidenced by a RADIUS account START message, etc.).

Figure 2:
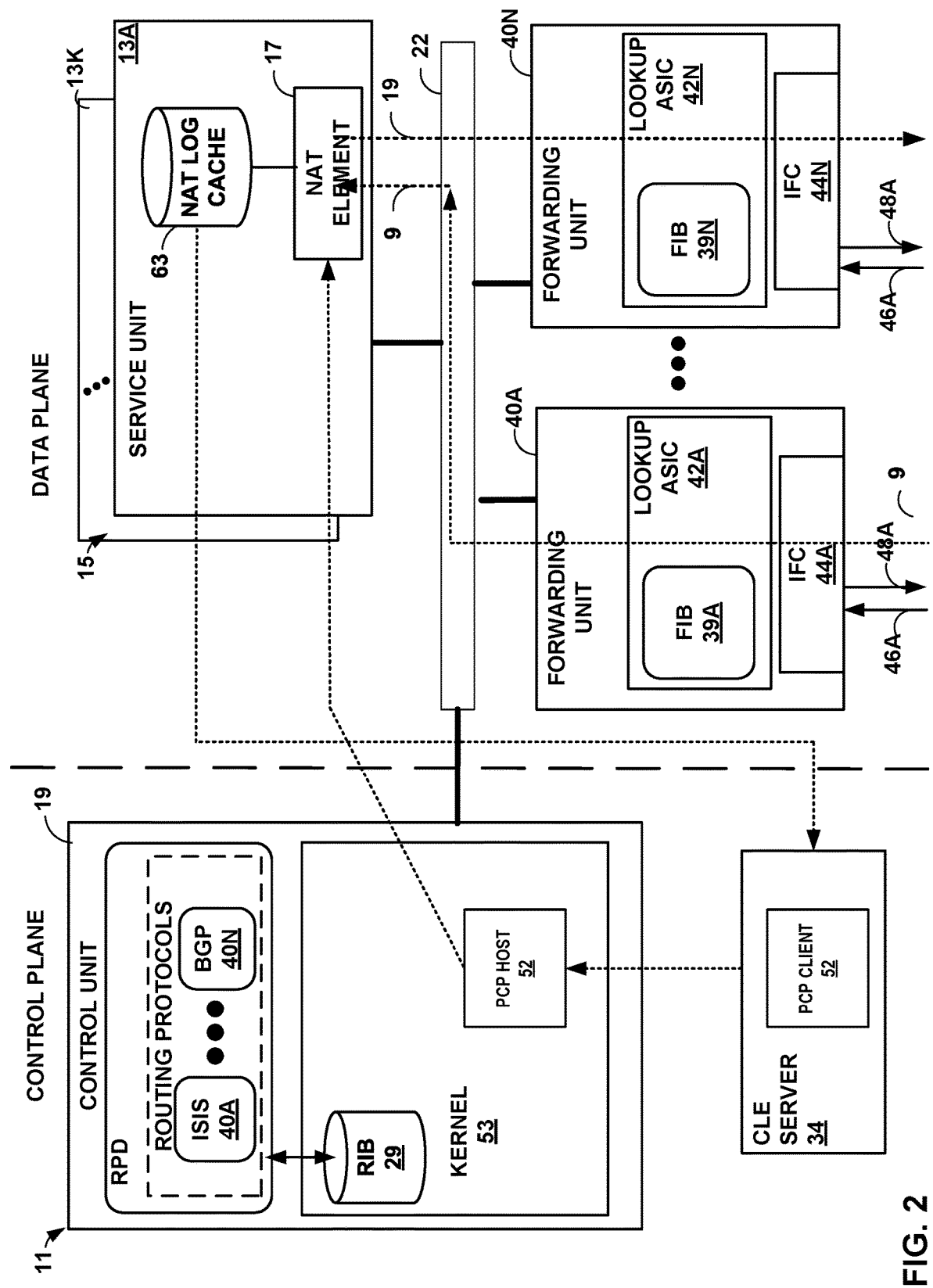
FIG. 2 illustrates an example gateway router that incorporates the NAT functions described herein.

FIG. 2 is a block diagram illustrating, in further detail, an example embodiment of NAT device 41 of FIG. 1. In the illustrated example, NAT device 41 is divided into two logical or physical "planes" to include a control plane 11 that performs control operations for the device and a data plane 15 for forwarding transit network traffic. That is, NAT device 41 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 11 includes control unit 19, which executes the device management services, subscriber authentication and control plane routing functionality of gateway router 32. For, control unit 19 represents hardware or a combination of hardware and software of control that implements routing plane routing protocols 40A-40N ("routing protocols 40") by which routing information stored in a routing information base 29 ("RIB 29") may be determined. RIB 29 may include information defining a topology of a network, such as service provider network 20 of FIG. 1. Routing protocols 40 interact with kernel 53 (e.g., by way of API calls) executing on control unit 19 to update routing information base (RIB) 29 based on routing protocol messages received by NAT 41. Control unit 19 may resolve the topology defined by routing information in RIB 29 to select or determine one or more routes through the network. For example, the kernel may generate forwarding information in the form forwarding information bases 39A-39N ("FIBs 39") based on the network topology represented in RIB 29, i.e., performs route resolution. For example, the kernel may determine the physical interface port to be used for the forwarding next hops. A routing unit (sometimes referred to as a "routing protocol process" or "RPD") may then program forwarding units 40 of data plane 15 with FIBs 39, which installs the FIBs within lookup ASICs 42.

Data plane 15, in this example, is a decentralized data plane in that data plane functionality and packet forwarding functionality is distributed among a plurality of forwarding units 40A-40N ("forwarding units 40"). Data plane 15 may include forwarding units 40 that provide high-speed forwarding of network traffic received by interface cards 44A-44N ("IFCs 44") via inbound links 46A-46N to outbound links 48A-48N. Forwarding units 40 may each comprise one or more packet forwarding engine ("PFE") coupled to respective interface cards 44 and may represent, for example, a dense port concentrator (DPC), modular port concentrator (MPC), flexible physical interface card (PIC) concentrator (FPC), or another line card, for example, that is insertable within a chassis or combination of chassis.

In addition, data plane 15 includes service units 13A-13K ("service units 13") that may be, as examples, removable service cards, which are configured to apply network services to packets flowing through data plane 15.

Internal switch fabric 22 couples control unit 19, service units 13, and forwarding units 40 to deliver data units and control messages among the units. Switch fabric 22 may represent an internal switch fabric or cross-bar, bus, or link. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

As shown in the example of FIG. 2, each of forwarding units 40A-40N includes a respective lookup ASIC 42A-42N that receives control and data session traffic via IFC cards 44, performs route lookups and, based on the result according to internal routes installed to FIBs 39, forwards the traffic to control unit 19 (control traffic) or to one of forwarding units 40 (transit data traffic) for output via an interface to one of output links 48. In one example, lookup ASICs 42 are microcode-controlled chipsets programmably configured by a slave microprocessor executing on each of forwarding units 40. Specifically, one or more of lookup ASICs 42 is controllable by internal microcode programmed by the slave microprocessor. The slave microprocessor programs a corresponding FIB 39 into internal memory of each lookup ASICs 42 within the data plane 15.

When forwarding packets, control logic within each lookup ASICs 42 traverses FIB 39 and, upon reaching a FIB entry for the packet (e.g., a leaf node), the microcode-implemented control logic automatically selects one or more forwarding next hops (FNHs) for forwarding the packet. Lookup ASIC 42A may be implemented using a forwarding application specific integrated circuits (ASICs), field programmable gate arrays (FPGAs), or any other equivalent integrated or discrete logic circuitry, as well as any combinations of such components. Each of forwarding units 40 may include substantially similar components to perform substantially similar functionality, said components and functionality being described hereinafter with respect to forwarding unit 40A.

Each subscriber management unit 10 provides a computing environment for executing application of various packet-processing services 36, including NAT element 17, to packet flows traversing forwarding plane 15. As packets are received by NAT 41 for packet flows, such as inbound packet flow 9, forwarding units 40 direct the packet flows to service cards 13, where NAT element 17 performs network address translation prior to outputting the packet flow on an output interface. As NAT element 17 performs network address translation, it creates a NAT event log to store in NAT log cache 63. The NAT event log comprises the private address, the public address and a timestamp of when the translation took place. From time-to-time, CLE server 34 retrieves the NAT event log to determine which subscriber to attribute the network traffic to.

In the illustrated example, kernel 53 includes communication protocol host 52. Alternatively, in some examples, communication protocol host 52 may be executed in the data plane XX, by for example, service unit 13 operating NAT element 17. The communication protocol host 52 receives clear requests from CLE server 34 when one of subscriber devices 18 disconnects from BGW 36. The clear request causes NAT element 17 to clear the binding that maps the public/private address pair associated with a private address included in the clear request. As a result, NAT element 17 drops data packets that are received for the private address and does not generate NAT event logs associated with the private address until NAT element 17 receives an indication that the private address has been reassigned to another one of subscriber devices 18.

Figure 3A:
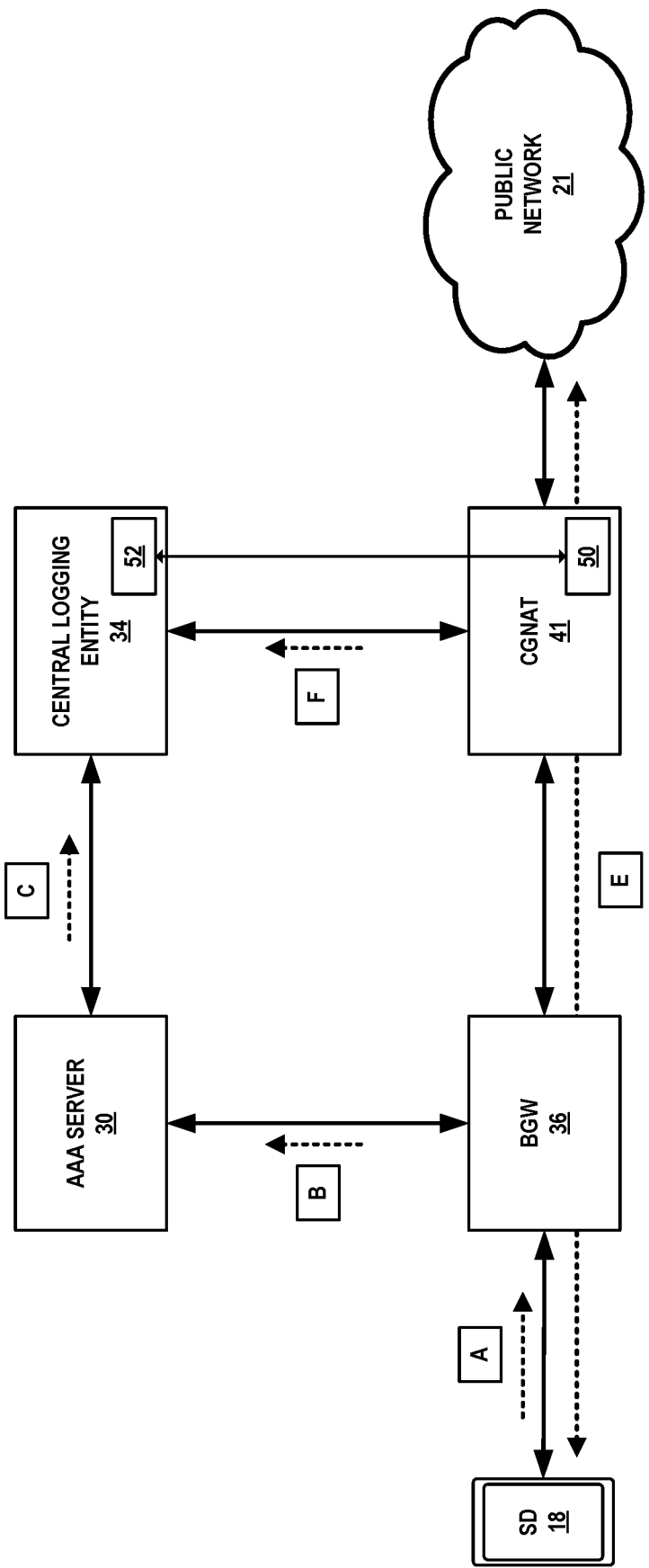
FIGS. 3A and 3B are conceptual diagrams illustrating synchronizing the NAT, according to the techniques described herein.
Figure 3B:
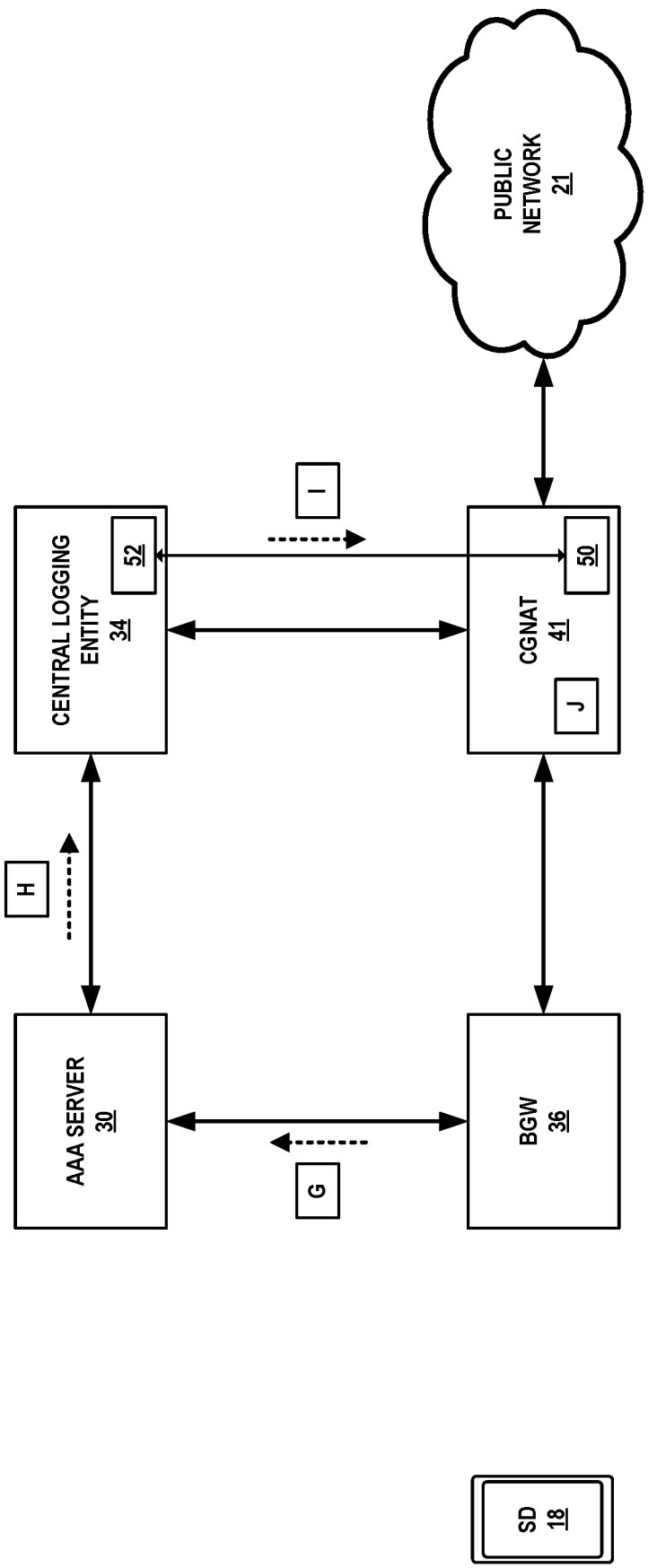

FIGS. 3A and 3B are conceptual diagrams illustrating synchronizing the NAT, according to the techniques described herein. FIG. 3A illustrates SD 18 connecting to BGW 36 to receive traffic from, for example, public network 21. SD 18 connects to BGW 36 (A). For example, SD 18 may be a mobile device connecting to a base station of a wide area network to receive traffic from public network 21 via wireless data communication. SD 18 receives a private IP address from BGW 36 and NAT 41 generates a NAT binding that maps the assigned private IP address to a public IP address such that traffic send to the public IP address destined for SD 18 is routed to SD 18 via the private IP address. BGW 36 sends a registration message to AAA server 30 (B). In some examples, the registration message is a RADIUS account START message that comprises the private IP address, a timestamp, and an identifier of SD 18 (e.g., a MAC address, an MSISDN, etc.). The registration message is proxied to CLE 34 (C). The CLE 34 then includes a private IP address associated with an identifier of a subscriber and/or subscriber device 18. Traffic flows from public network 21 to SD 18 (E). As traffic flows, NAT 41 performs network address translation to direct packets received via the public IP address to the private IP address associated with SD 18 according to the NAT binding. When NAT 41 performs an instance of network address translation on a packet, NAT 41 generates a NAT event log comprising a public address, a private address, and a timestamp. From time-to-time, CLE 34 retrieves and/or otherwise receives the NAT event logs from NAT 41 (F). This facilitates attributing network traffic to SD 18 for, for example, legal, billing and/or account management purposes. This continues while SD 18 is connected to BGW 36.

FIG. 3B illustrates after SD 18 disconnects from BGW 36. Upon SD 18 disconnecting from BGW 36, BGW 36 sends a deregistration message comprising private IP address, a timestamp, and an identifier of SD 18 to AAA server 30 (G). In some examples, the deregistration message is a RADIUS account STOP message. The deregistration message is proxied to CLE 34 (H). In response to receiving the deregistration message, CLE 34 sends a clear request comprising the private IP address to NAT 41 via communication protocol client 52 (I). In response to the clear request, NAT 41 clear the NAT binding that maps the private IP address in the clear request to the public IP address (J). Accordingly, NAT 41 drops traffic sent to the public IP address and destined for the private IP address and does not generate NAT event logs associated with the private address until a new subscriber device is assigned to the private IP address. As a result, the NAT event logs are only generated when a subscriber device is connected, thus preventing false attribution or over attribution of network traffic.

Figure 4:
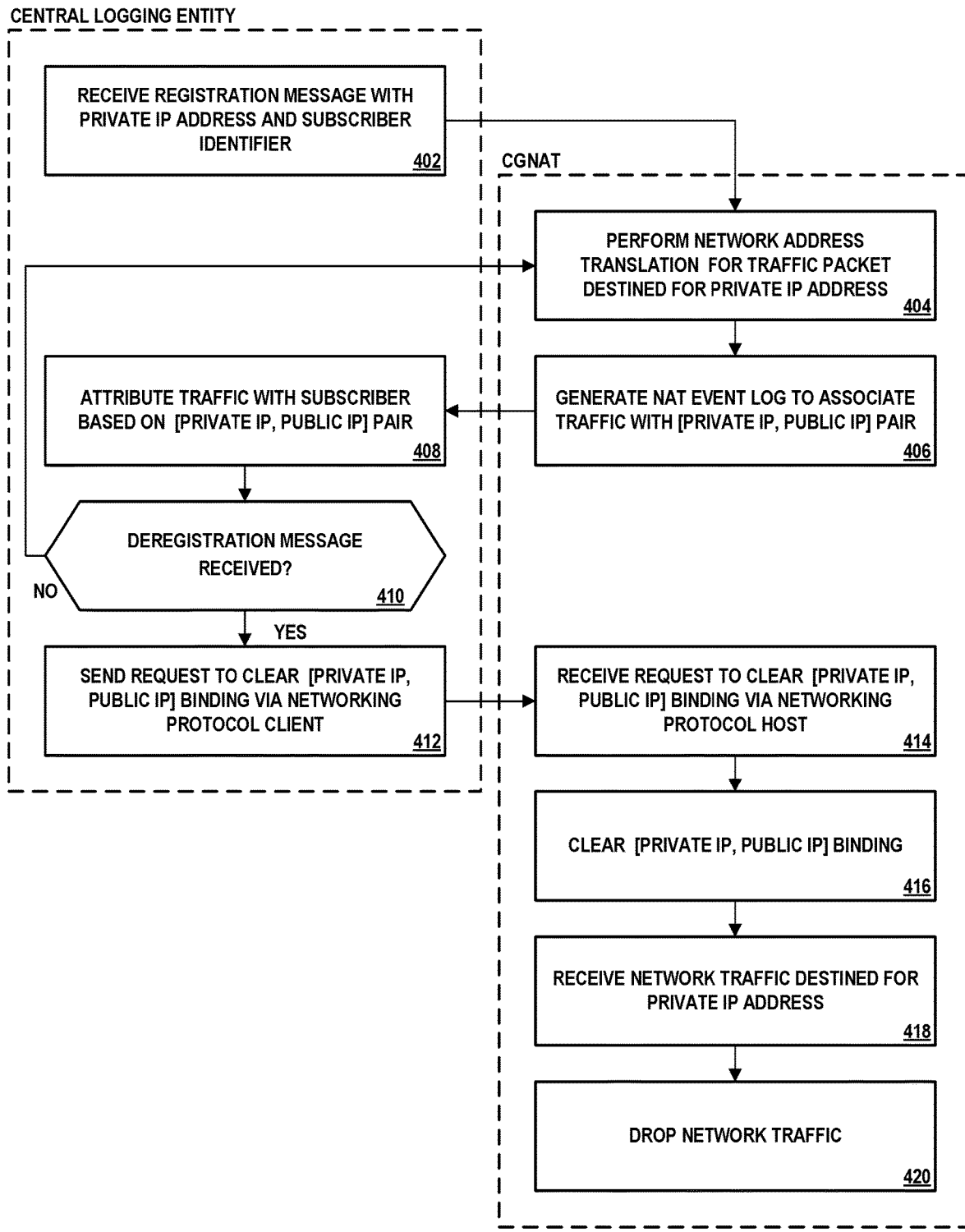
FIG. 4 is a flowchart illustrating an example of synchronizing the network address translation (NAT), according to the techniques described herein.

FIG. 4 is a flowchart illustrating an example of synchronizing the network address translation (NAT), according to the techniques described herein. Initially, CLE 34 receives a registration message with a private IP address and a subscriber identifier (402). NAT 41 performs network address translation on traffic packet destined for the private IP address (404). NAT 41 generates a NAT event log for associate the traffic packet with a private IP address-public IP address pair (406). CLE 34 associates the traffic packet with the subscriber identifier (408). Traffic is logged and attributed in this manner until a deregistration message is receives ("NO" at 410). When a deregistration message is received ("YES" at 410), CLE 34 sends a clear request comprising the private IP address to NAT 41 via communication protocol client 52 (412). NAT 41 receives the clear request via communication protocol host 50 (414). NAT 41 clears the NAT binding that maps the public IP address and the private IP address identified in the clear message (416). Subsequently, NAT 41 receives traffic packets destined for the private IP address via the public IP address (418). NAT 41 drops that network traffic (420).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:
1. A system comprising:
a central logging entity (CLE) server, including a communication protocol client communicatively coupled to a communication protocol host, the CLE server configured to, in response to receiving a deregistration message from a registration protocol server, send a clear request message comprising a private address via the communication protocol client, the deregistration message including the private address; and a network address translation (NAT) device, including the communication protocol host, the NAT device configured to, in response to receiving the clear request message comprising the private address via the communication protocol host, clear a binding that maps the private address to a public address to prevent network address translation between the private address and the public address.

2. The system of claim 1, wherein the deregistration message is a Remote Authentication Dial-In User Service (RADIUS) protocol account stop message.

3. The system of claim 1, wherein the deregistration message is a diameter protocol Cancel-Location-Request message.

4. The system of claim 1, wherein the deregistration message is a general packet radio service tunneling protocol (GTP-C) message.

5. The system of claim 1, wherein the communication protocol client and the communication protocol host conform to the port control protocol.

6. A method comprising:
in response to receiving a deregistration message from a registration protocol server, sending, by a central logging entity (CLE) server including a communication protocol client communicatively coupled to a communication protocol host, a clear request message comprising a private address via the communication protocol client, the deregistration message including the private address;

in response to receiving the clear request message comprising the private address via the communication protocol host, clearing, by a network address translation (NAT) device including the communication protocol host, a binding that maps the private address to a public address to prevent network address translation between the private address and the public address.

7. The method of claim 6, wherein the deregistration message is a Remote Authentication Dial-In User Service (RADIUS) protocol account stop message.

8. The method of claim 6, wherein the deregistration message is a diameter protocol Cancel-Location-Request message.

9. The method of claim 6, wherein the deregistration message is a general packet radio service tunneling protocol (GTP-C) message.

10. The method of claim 6, wherein the communication protocol client and the communication protocol host conform to the port control protocol.

11. A computer readable medium comprising instructions that, when executed, cause a central logging entity (CLE) server to:
operate a communication protocol client communicatively coupled to a communication protocol host of a network address translation (NAT) device;

attribute network traffic to a subscriber device associated with a private address based on NAT event logs generated by the NAT device resulting from network address translation between the private address and a public address; and in response to receive a deregistration message from a registration protocol server indicative of the subscriber device no longer being associated with the private address, send a clear request message comprising the private address included in the deregistration message to the NAT device via the communication protocol client, the clear request message to cause the NAT device to clear a binding that maps the private address to a public address and prevent network address translation between the private address and the public address.

12. The method of claim 11, wherein the deregistration message is a Remote Authentication Dial-In User Service (RADIUS) protocol account stop message.

13. The method of claim 11, wherein the deregistration message is a diameter protocol Cancel-Location-Request message.

14. The method of claim 11, wherein the deregistration message is a general packet radio service tunneling protocol (GTP-C) message.

15. The method of claim 11, wherein the communication protocol client and the communication protocol host conform to the port control protocol.

* * * * *